United States Patent [19]

Oliver et al.

[11] Patent Number: 5,548,278

[45] Date of Patent: * Aug. 20, 1996

[54] SELF-CALIBRATING HYDRAULIC FLUID LEAK DETECTION SYSTEM

[75] Inventors: Joseph J. Oliver, Lincoln, Nebr.; Christopher L. Young, Fargo, N. Dak.; Richard D. Bednar, Lake Mills, Wis.

[73] Assignee: Ransomes America Corporation, Lincoln, Nebr.

[*] Notice: The term of this patent shall not extend beyond the expiration date of Pat. No. 5,402,110.

[21] Appl. No.: 328,929

[22] Filed: Oct. 25, 1994

Related U.S. Application Data

[63] Continuation-in-part of Ser. No. 191,518, Feb. 3, 1994, Pat. No. 5,402,110.

[51] Int. Cl.$^6$ .................................................. G08B 21/00
[52] U.S. Cl. ............................ 340/605; 73/295; 73/290 R
[58] Field of Search ............................... 340/605; 73/295, 73/290 B, 290 R, 292, 49.2 T; 364/551.01, 509

[56] References Cited

U.S. PATENT DOCUMENTS

| | | | |
|---|---|---|---|
| 3,438,247 | 6/1967 | Lotti et al. | 73/40 |
| 3,568,705 | 3/1971 | Boyadjieff et al. | 137/87 |
| 3,576,959 | 5/1971 | Bogosoff | 340/450.1 |
| 3,667,605 | 6/1972 | Zielinski | 210/170 |
| 3,685,531 | 8/1972 | Byford | 91/421 |
| 3,708,245 | 1/1973 | King | 417/13 |
| 4,020,481 | 4/1977 | Nakagawa | 340/624 |
| 4,057,700 | 11/1977 | Nakashima | 200/84 C |
| 4,090,396 | 5/1978 | O'Brien | 340/624 |
| 4,152,925 | 5/1979 | Lindh | 73/40.5 R |
| 4,274,328 | 6/1981 | Pedersen | 91/445 |
| 4,522,109 | 6/1985 | Marchi et al. | 91/420 |
| 4,522,167 | 6/1985 | Hurner | 184/103.1 |
| 4,549,429 | 10/1985 | Kurt | 73/40 |
| 4,563,674 | 1/1986 | Kobayashi | 340/620 |
| 4,571,987 | 2/1986 | Horner | 73/292 |
| 4,590,462 | 5/1986 | Moorehead | 340/605 |
| 4,591,837 | 5/1986 | Martinez | 340/605 |
| 4,611,620 | 9/1986 | Wang | 137/100 |
| 4,732,035 | 3/1988 | Lagergren et al. | 73/49.2 T |
| 4,750,775 | 6/1988 | Miller | 296/38 |
| 4,781,057 | 11/1988 | Hyfantis, Jr. et al. | 73/49.2 T |
| 4,811,601 | 3/1989 | Tolan | 73/49.2 T |
| 4,827,762 | 5/1989 | Hasselmann | 73/49.2 T |
| 4,852,054 | 7/1989 | Mastandrea | 340/605 |
| 4,954,973 | 9/1990 | Jacob et al. | 364/551.01 |
| 4,961,064 | 10/1990 | Hara | 338/231 |
| 4,987,769 | 1/1991 | Peacook et al. | 73/49.7 |
| 5,021,665 | 6/1991 | Ames | 250/351.1 |
| 5,156,042 | 10/1992 | Carlin et al. | 73/49.2 T |
| 5,187,973 | 2/1993 | Kunze et al. | 364/509 |
| 5,315,529 | 5/1994 | Farmer | 364/509 |
| 5,402,110 | 3/1995 | Oliver et al. | 340/605 |

Primary Examiner—John K. Peng
Assistant Examiner—Julie B. Lieu
Attorney, Agent, or Firm—Harness, Dickey and Pierce, P.L.C.

[57] ABSTRACT

A hydraulic fluid lead detection system which self-calibrates for operation regardless of the particular reservoir or expansion tank. A reservoir stores a quantity of hydraulic fluid and is connected via a connecting tube or hose located at the upper-most portion of the reservoir and connected to an expansion tank mounted substantially adjacent to the reservoir. An elongated tube extends down into the expansion tank. The end of this tube is maintained substantially below the level of hydraulic fluid in the expansion tank during operation of the turf care machine. During operation, the hydraulic fluid expands with rising temperatures, and the connecting tube communicates the expanding fluid to the expansion tank. A float type fluid level sensor measures the level of hydraulic fluid within the expansion tank and outputs an electronic signal corresponding to the fluid level in the expansion tank to the microcomputer based monitoring unit, which also senses the fluid temperature. The monitoring unit includes memory for storing a table of fluid temperatures versus fluid levels in the expansion tank stored during calibration of the system. During operation, the monitoring unit receives and interprets electronic signals from the float and temperature and compares the table values in memory to the values received from the float and temperature sensors to identify possible fluid leaks in the system.

46 Claims, 9 Drawing Sheets

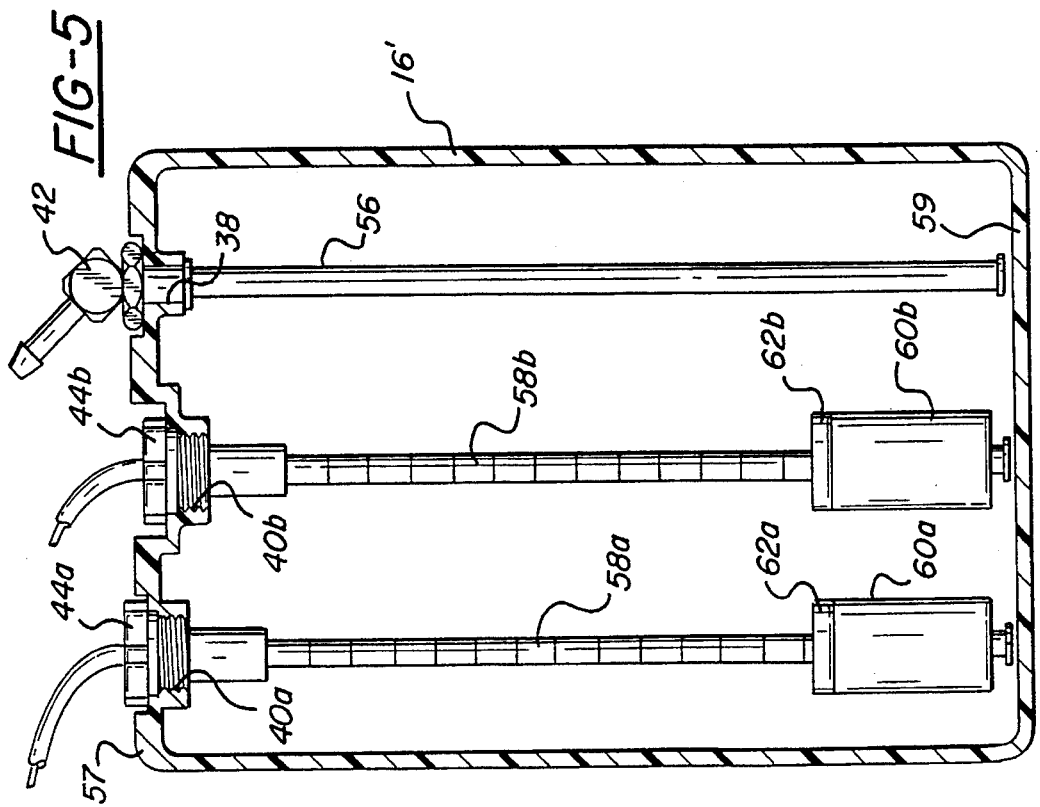
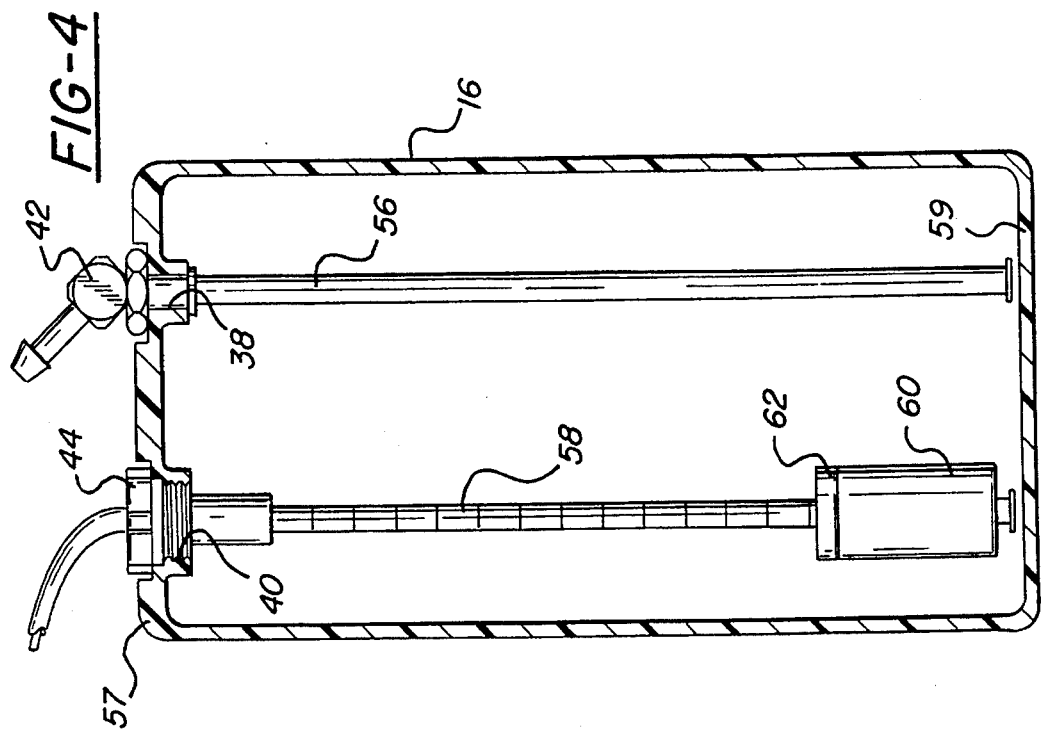

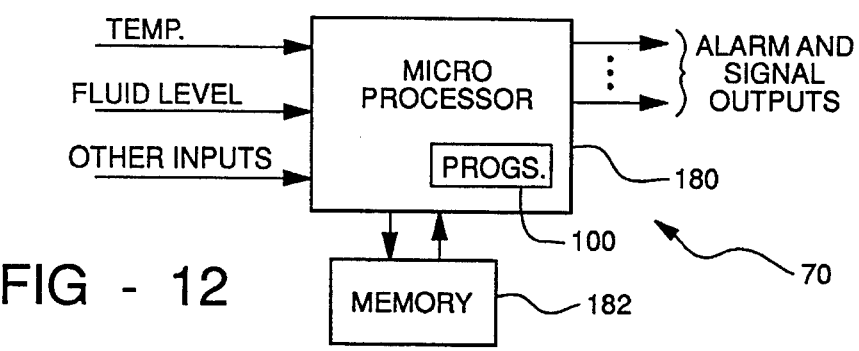
FIG - 12
| OIL LEVEL | TEMPERATURE |
|---|---|
| * | * |
| * | * |
| * | * |
| 40 COUNTS | 50°F |
| 47 COUNTS | 56°F |
| 51 COUNTS | 62°F |
| 55 COUNTS | 70°F |
| 61 COUNTS | 73°F |
| 65 COUNTS | 77°F |
| * | * |
| * | * |
| * | * |
| 115 COUNTS | 100°F |
| 121 COUNTS | 106°F |
| 125 COUNTS | 110°F |
| 129 COUNTS | 115°F |
| 135 COUNTS | 120°F |
| 140 COUNTS | 126°F |
| * | * |
| * | * |
| * | * |
FIG - 13
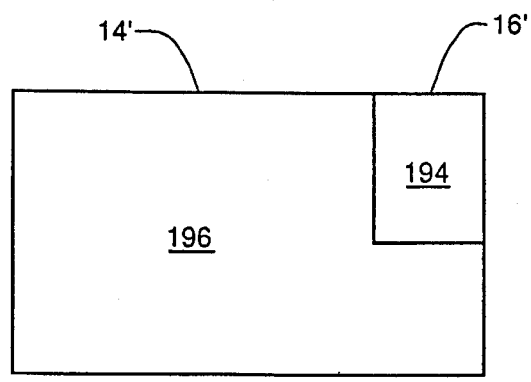
FIG - 14

SELF-CALIBRATING HYDRAULIC FLUID LEAK DETECTION SYSTEM

This application is a continuation-in-part of United States patent application Ser. No. 08/191,518, filed Feb. 3, 1994 U.S. Pat. No. 5,402,110 patent Mar. 28, 1995.

BACKGROUND OF THE INVENTION

1. Field of the Invention

The present invention relates generally to turf care equipment, and more particularly, to a system which self-calibrates and which detects the occurrence of leaks in a hydraulic fluid system of a turf care machine and for providing a warning to the machine operator of such condition. Further, the present invention relates to a leak detection system which is adaptable to hydraulic fluid reservoirs of varying size and shape and which alleviates the need for fixed, tank-specific calibrations.

2. Discussion

Turf care machines are powered by a variety of means such as belts and pulleys, shafts and linkages, and the like. A common method of powering a turf care machine is to provide a source of pressurized hydraulic fluid. The pressurized hydraulic fluid can be used to power hydrostatic drive motors for propelling the turf care machine or for powering various implements such as mowers, aerators and the like. One problem with such machines is the potential for developing a leak in the hydraulic system. Should the system develop a large leak, the hydraulic fluid, under pressure, is rapidly expelled from the hydraulic system and onto the turf being treated by the machine. Often, because the machine is being operated early in the morning or late in the evening, the operator does not see the fluid spewing onto the turf until a considerable amount has leaked out, and the damage to the turf has been done. In other cases, the system develops a slow leak which leaks almost imperceptible amounts of hydraulic fluid onto the turf, but amounts sufficient to cause damage. Moreover, because the slow leak is not readily detected, fluid may be lost over several greens hence causing widespread damage. Because of the time required to grow a golf course green, sometimes several years to full maturity, and the cost associated with starting and maintaining a green, generally tens of thousands of dollars, it is vitally important to be able to detect when a machine incorporating a hydrostatic drive system has developed a leak.

U.S. Pat. No. 4,591,837 to Martinez (the Martinez system), the disclosure of which is hereby incorporated by reference, discloses a system for detecting when a hydrostatic drive system of a turf care machine has developed a leak and for providing a warning signal if such a leak occurs. The system includes a tube which communicates with and extends above the hydraulic fluid reservoir. A chamber is disposed above the tube, and there is a float disposed within the tube. At the start of operation, the machine operator fills the hydraulic fluid reservoir such that the float remains near the top of the tube. The float has a contact imbedded therein, and the tube has complementary contacts positioned such that when the float is near the top of the tube a circuit is established. During operation, expanding fluid is allowed to flow past the float and into the chamber. If a leak occurs, the fluid level within the reservoir begins to drop. If it drops a sufficient amount such that float moves away from the top of the tube, the circuit is broken and a leak is indicated.

The Martinez system suffers a number of disadvantages. First, the operator must manually drain fluid from the chamber back into the reservoir each time before using the machine. In addition, the system is only capable of accommodating a modest amount of fluid expansion. A second embodiment of the Martinez system includes a drain port for slowly allowing the fluid in the chamber to drain back into the reservoir. This relieves the operator of the task of draining the fluid back into the reservoir, however, it makes the system ineffectual for detecting small leaks. Furthermore, the Martinez system is not adapted to indicate the actual amount of hydraulic fluid within the system or the temperature of the hydraulic fluid.

Further, current leak detection systems are generally reservoir specific and require that particular, physical information, detailing the particular system on which the leak detection apparatus is installed, be hard coded into the system processor. While such calibration may be acceptable if the leak detection apparatus were installed on a limited number of hydraulic systems, such system specific calibration would be unacceptable if the size and shape of expansion tanks varied in accordance with the available space for installing the expansion tank. Thus, a particular calibration would be required for each leak detection system corresponding to a hydraulic system with an expansion tank having a unique size and shape. Furthermore, if the expansion tank incurs damage which changes the size or shape of the tank, the installation calibration fails to accurately reflect the calibrated size and shape of the expansion tank. Such a change in the size and shape requires recalibration of the physical information programmed into the processor during the original installation. Thus, a self-calibrating leak detection system would significantly improve the overall accuracy and flexibility of leak detection systems.

SUMMARY OF THE INVENTION

The present invention provides a self-calibrating hydraulic leak detection system which includes a reservoir for holding a quantity of hydraulic fluid. The reservoir is connected via a connecting tube or hose to an expansion tank mounted substantially adjacent to the reservoir. The expansion tank includes a fitting having an elongated tube extending down into the expansion tank. The end of this tube is maintained substantially below the level of hydraulic fluid in the expansion tank during operation of the turf care machine to which it is attached. As the machine is operated, the hydraulic fluid expands with rising temperature, and the connecting tube communicates the expanding fluid to the expansion tank. When operation of the machine is discontinued the hydraulic fluid contracts as it cools. As the hydraulic fluid within the system contracts, the hydraulic fluid in the expansion tank is automatically drawn, by siphoning action, through the elongated tube from the expansion tank through the connecting tube and back into the reservoir.

The self-calibrating hydraulic leak detection system further includes at least one float type fluid level sensor mounted to measure the level of hydraulic fluid within the expansion tank. The float level sensor sends an electronic signal corresponding to the fluid level in the expansion tank to a microcomputer based monitoring unit. The monitoring unit also senses the fluid temperature in the reservoir and interprets the electronic signals, compensating for volumetric fluctuations due to the changing fluid temperature, and determines if conditions indicate a hydraulic fluid leak exists. If so, the monitoring unit produces a warning signal which is communicated to the turf machine operator.

The self-calibrating hydraulic leak detection system further includes memory for storing the level of the hydraulic fluid in the expansion tank and the temperature of the hydraulic fluid for comparing the stored level and temperature with the measured level and temperature as indicated by the electronic signals received by the monitoring unit and determines if conditions indicate a hydraulic fluid leak exists. If so, the monitoring unit produces a warning signal which is communicated to the turf machine operator.

In an additional embodiment of the present invention, the expansion tank is made integral to and mounted above the reservoir. As the hydraulic fluid is heated it expands directly into the expansion chamber where at least one float sensor measures the height of the fluid therein.

The self-calibrating hydraulic fluid leak detection system of the present invention is also operable to display to the machine operator the actual amount of hydraulic fluid within the system and is capable of indicating if the level is too low as well as too high.

The self-calibrating hydraulic fluid leak detection system of the present invention is also operable to report the temperature of the hydraulic fluid in the system and to provide a warning indication if the fluid temperature is too high.

The self-calibrating hydraulic fluid leak detection system of the present invention is further operable to determine the existence of a leak in the hydraulic fluid system based upon the changing volume of fluid within the expansion tank.

The self-calibrating hydraulic fluid leak detection system is also operable to vent air in the system through the reservoir, into the expansion tank, and then to atmosphere so that unwanted air may be purged from the system.

The self-calibrating hydraulic fluid leak detection system is also operable to detect leaks during both the operation and transport of the vehicle on which the self-calibrating hydraulic system is installed.

The self-calibrating hydraulic fluid leak detection system is also operable to compensate for the change in shape of the expansion tank by recalibrating the system, thus alleviating the need to hard code the physical system parameters into the processor.

The self-calibrating hydraulic fluid leak detection system further includes an expansion tank having a smaller horizontal area than the reservoir to effect a multiplication of the expansion fluid in the reservoir in accordance with the ratio of the horizontal area of the expansion tank to the horizontal area of the reservoir.

The self-calibrating hydraulic fluid leak detection system is also operable to include a flared section at the top of the expansion tank to provide volume to compensate for fluid overflow.

These and other objects, advantages and features of the present invention will become readily apparent from the following detailed description, subjoined claims and drawings.

BRIEF DESCRIPTION OF THE DRAWINGS

FIG. 4 is a sectional view taken along line 4—4 of FIG. 2 illustrating the arrangement of the level sensor within the expansion tank of the hydraulic fluid leak detection system of the present invention;

FIG. 5 is a view similar to FIG. 4 illustrating an alternative embodiment of the level sensor of the self-calibrating hydraulic fluid leak detection system of the present invention;

FIG. 12 is a block diagram of the microprocessor for implementing the self-calibrating leak detection system;

FIG. 13 is an exemplary map of hydraulic fluid temperature versus hydraulic fluid level in the expansion tank; and FIG. 14 is a sectional view through the line 14—14 of the reservoir and expansion tank depicted in FIG. 11 and demonstrates an additional feature of the present invention.

DETAILED DESCRIPTION OF THE PREFERRED EMBODIMENTS

Figure 1:
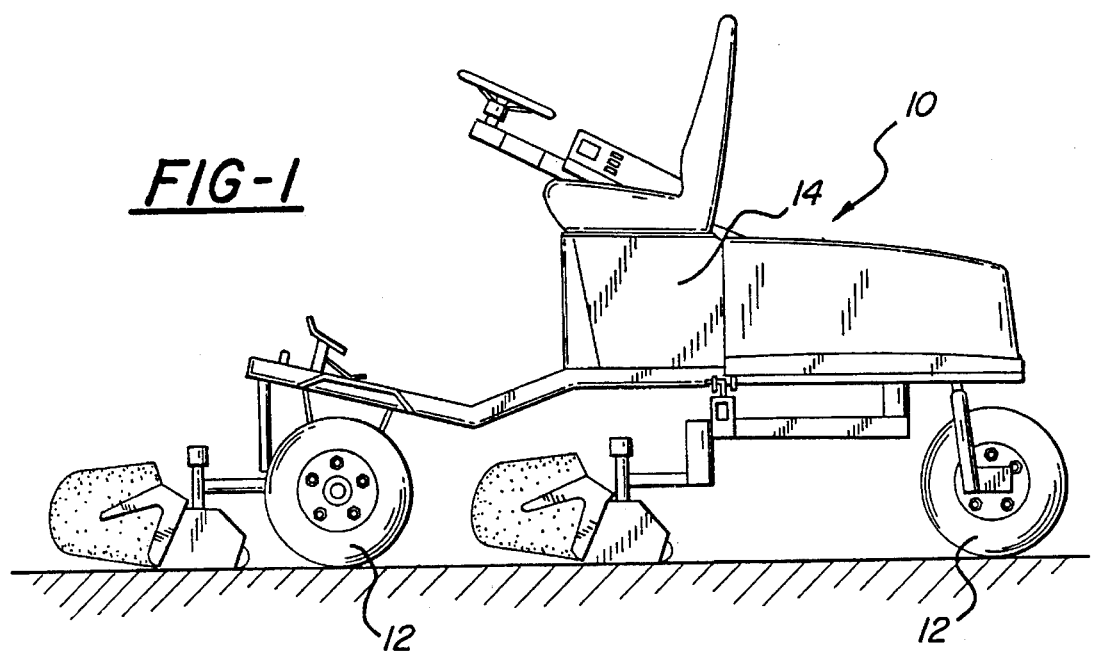
FIG. 1 is a perspective view of a typical turf machine having a pressurized hydraulic fluid system and being fitted with the self-calibrating hydraulic oil leak detection system of the present invention.

With reference to the drawings, and particularly FIG. 1, a typical turf machine 10 which is adapted as a riding type greens mower is shown. Turf machine 10 includes a plurality of ground engaging wheels 12 which are adapted to be driven by hydrostatic motors from a source of pressurized hydraulic fluid. Such a system is disclosed and described in U.S. Pat. No. 5,199,525 assigned to Ransomes, Inc. the disclosure of which is hereby expressly incorporated by reference. The hydraulic fluid system includes a reservoir 14 for providing a supply of hydraulic fluid to a pressurizing pump typically driven by an internal combustion engine, and control valuing for distributing the pressurized fluid via a plurality of conduits to the hydrostatic drive motors and for returning low pressure fluid to reservoir 14. The hydraulic system further includes an expansion tank 16 (shown in FIG. 2). During operation of the machine, the fluid is heated by the work imparted upon it by the pressurizing pump and by transfer from the various elements of turf machine 10. Heating of the fluid causes its thermal expansion, and the expanding fluid is communicated from reservoir 14 to expansion tank 16.

Figure 2:
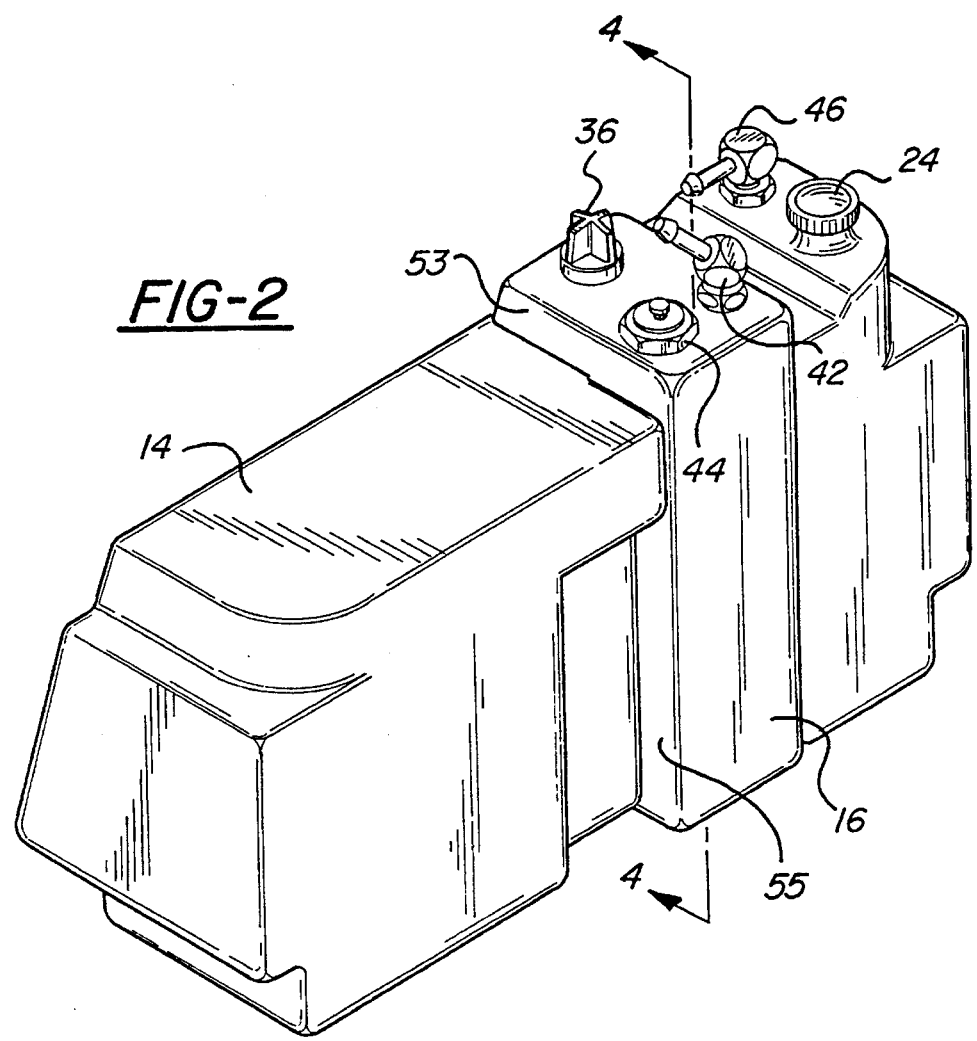
FIG. 2 is an assembly perspective of the self-calibrating hydraulic oil leak detection system of the present invention removed from the turf machine.
Figure 3:
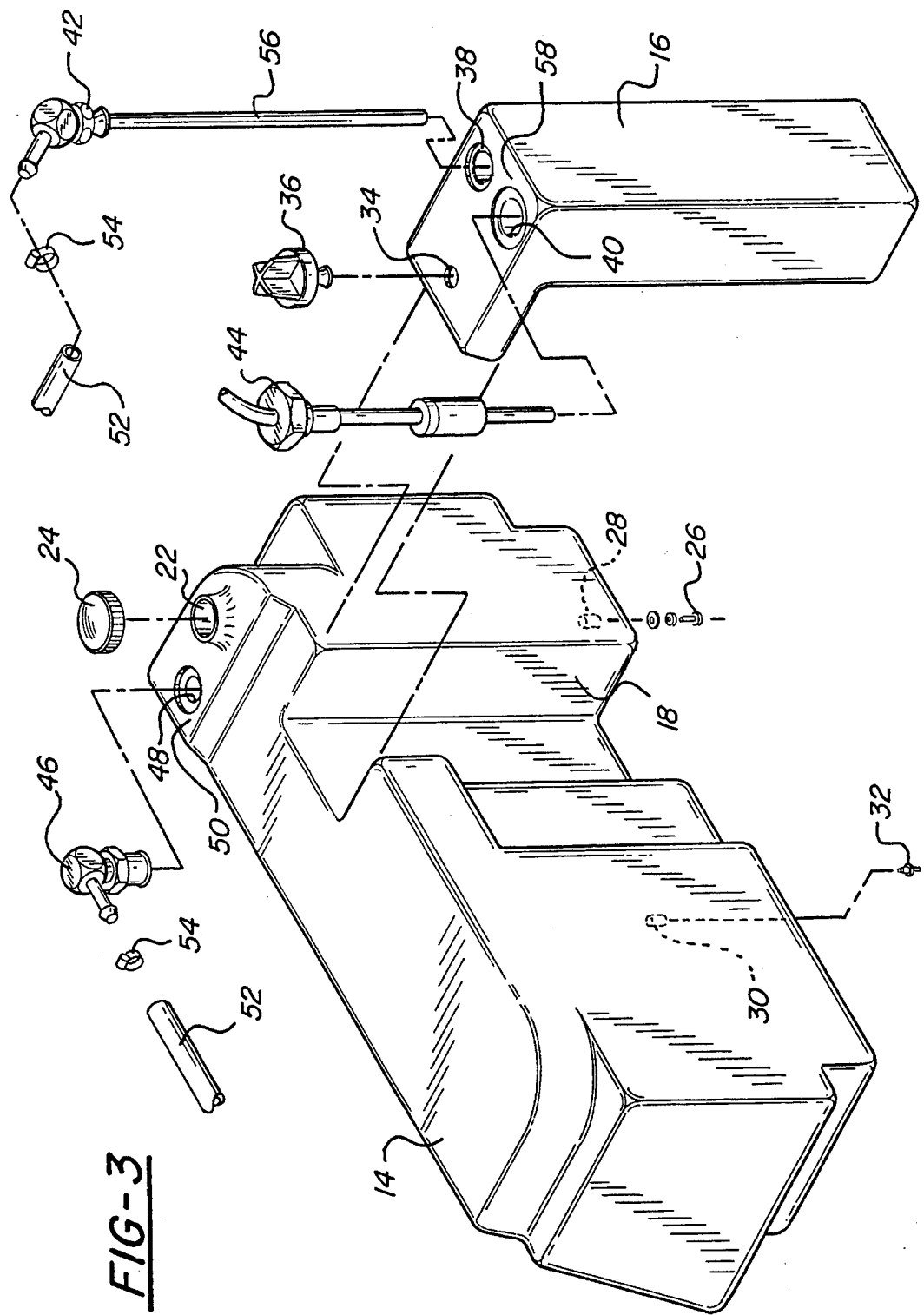
FIG. 3 is an exploded assembly perspective of the self-calibrating hydraulic oil leak detection system of the present invention.

FIGS. 2 and 3 illustrate reservoir 14, expansion tank 16 and the associated plumbing for interconnecting the two. More particularly, reservoir 14 is formed as a hollow vessel and expansion tank 16 is a similar, but smaller, vessel secured adjacent thereto. In the preferred embodiment shown, reservoir 14 is formed with an indented portion 18 and expansion tank 16 is formed to be received into the indented portion 18 for providing a contemporary, integral appearance. However, in accordance with the self-calibrating aspect of this invention, expansion tank 16 may assume any of a number of sizes and shapes in accordance with optimizing the design shape and other parameters of reservoir 14 and the installation within turf machine 10.

Reservoir 14 is formed with a plurality of fittings (not shown) for interconnecting with the hydraulic fluid system of turf machine 10 at either the side or bottom of reservoir 14, and further includes a filling port 22 which is sealed during operation of turf machine 10 by non-vented cap 24. Reservoir 14 is secured to turf machine 10 by a plurality of fasteners, one of which is shown at 26, which engage bosses 28 formed integral to reservoir 14. Reservoir 14 is further formed with an aperture 30 at its base for receiving temperature sensor 32. Expansion tank 16 is similarly secured to turf machine 10 by fasteners adjacent to reservoir 14. Expansion tank 16 includes a port 34 fitted with a breather plug 36 and a pair of ports 38 and 40 for securing an adaptor 42 and a level sensor 44, respectively.

Reservoir 14 is fitted with an angled adaptor 46 secured to a port 48 formed in its upper surface 50, and expansion tank 16 is fitted with adaptor 42 in port 38. A flexible conduit 52 interconnects adapters 46 and 42 and is secured thereto by clamps 54. Adaptor 42 further includes expansion tube 56 which extends from the upper surface 58 of expansion tank 16 to nearly the bottom 59 thereof. As will be appreciated, as hydraulic fluid within reservoir 14 expands due to heating, the expanding fluid is communicated via conduit 52 to expansion tank 16. When operation of turf machine 10 is discontinued, the hydraulic fluid within reservoir 14 and expansion tank 16 cools and contracts. The contracting fluid is drawn by siphoning action from expansion tank 16 to reservoir 14 by expansion tube 56 and conduit 52.

FIGS. 2 and 3 may be used to demonstrate particularly advantageous features of the present invention. First, with respect to the positioning of angled adapter 46 (in reservoir 14) which communicates hydraulic fluid expanding out of reservoir 14 through conduit 52 into adapter 42 and out expansion tube 56. Angled adapter 46 is preferably positioned at the upper-most portion of reservoir 14 so that any air trapped in the hydraulic system when the reservoir was initially filled may rise to the upper-most portion of reservoir 14 and escape through angled adapter 46. The air which escapes through angled adapter 46 is syphoned through conduit 52 and expansion tube 56 where it escapes into expansion chamber 16 and is vented through breather plug 36. In order for angled adapter 46 to be located at the upper-most portion of fluid reservoir 14, upper surface 50 must correspondingly be the upper most surface of reservoir 14. A second advantageous feature depicted in FIGS. 2-3 is an overflow portion 53 of expansion tank 16. As can be seen in FIGS. 2 and 3, overflow volume 53 horizontally projects away from the elongated portion 55 of expansion tank 16 and sits atop reservoir 14. The overflow volume 53 accommodates excess fluid when hydraulic fluid expands to the top of expansion tank 16. This provides additional hydraulic fluid volume in situations where the expansion tank may be initially overfilled or the hydraulic fluid temperature rises and causes expansion of the hydraulic fluid sufficient for causing fluid to flow into overflow volume 53.

FIG. 4 illustrates level sensor 44 secured in expansion tank port 40 and extending downwardly into expansion tank 16. In the preferred embodiment, level sensor 44 is an eleven inch long float type sensor. More particularly, level sensor 44 includes a shaft 58 within which are disposed a plurality of reed switches (not shown) and resistors (not shown) which are connected in series. The reed switches act as shunts for selectively connecting a plurality of the resistors in series. The reed switches are magnetically actuated, and level sensor includes a float 60 and a magnet 62 which are slidably disposed about shaft 58. As the fluid level within expansion tank 16 rises and falls, float 60 moves upwardly and downwardly along shaft 58. Magnet 62, secured to float 60 is also caused to move upwardly and downwardly along shaft 58 causing various switches to be closed. By sensing the resistance of level sensor 44 the position of float 60 and magnet 62 may be determined, and hence, the level of fluid within expansion tank 16 may be determined. A suitable level sensor 44 is model no. 1-90-116456 manufactured by Phoenix International Corporation of Fargo, N.D.

Figure 6:
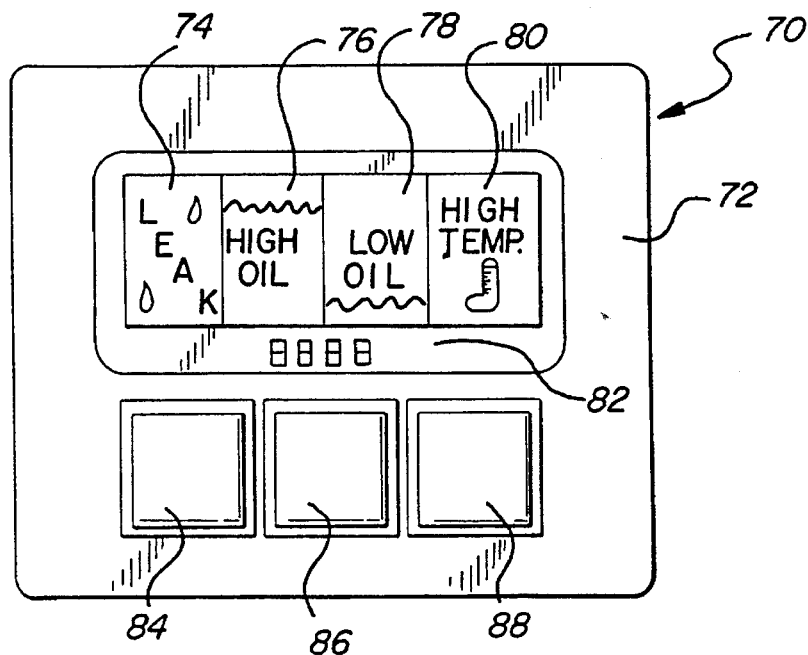
FIG. 6 is a plan view of the monitoring unit of the self-calibrating hydraulic fluid leak detection system of the present invention.

FIG. 6 illustrates the face of monitoring unit 70 for the leak detection system of the present invention. Monitoring unit 70 includes an annunciator panel 72 which includes a plurality of icons 74-80 for indicating the status of the hydraulic fluid system. For example, in the preferred embodiment, icons 80, 78, 76 and 74 are provided for indicating high fluid temperature, low fluid level, high fluid level and leak, respectively. Also, a numeric display 82 is provided for indicating the actual fluid level based upon the sensor reed switch closed or fluid temperature in engineering units. It should be understood that monitoring unit 70 is intended to be used outdoors and in sunlight and therefore that the icons 74-80 and display 82 should have sufficient illumination to be easily visible in sunlight. A plurality of membrane buttons 84-88 are also provided for allowing the turf machine operator to selectively view the system information and to calibrate the leak detection system. For example, pressing button 84 once displays temperature in degrees fahrenheit, pressing button 88 once displays the current fluid level in reed counts, pressing button 86 once clears the display, pressing and holding button 86 displays the calibration values, and pressing and holding all three buttons 84, 86, and 88 causes the calibrations to be written to the internal memory of the unit. In the preferred embodiment, monitoring unit 70, to be described further herein, is based upon a Motorola 6800 series micro-processor and includes at least one EEPROM memory device. Note that the monitoring unit 70 may be any of a number of microprocessors known to those skilled in the art. Further, the implementation and programming of the microprocessor are as typically appearing in the art and will be easily recognizable to those skilled in the art and need not be further described because from the following description, one could implement the subject invention.

Figure 7:
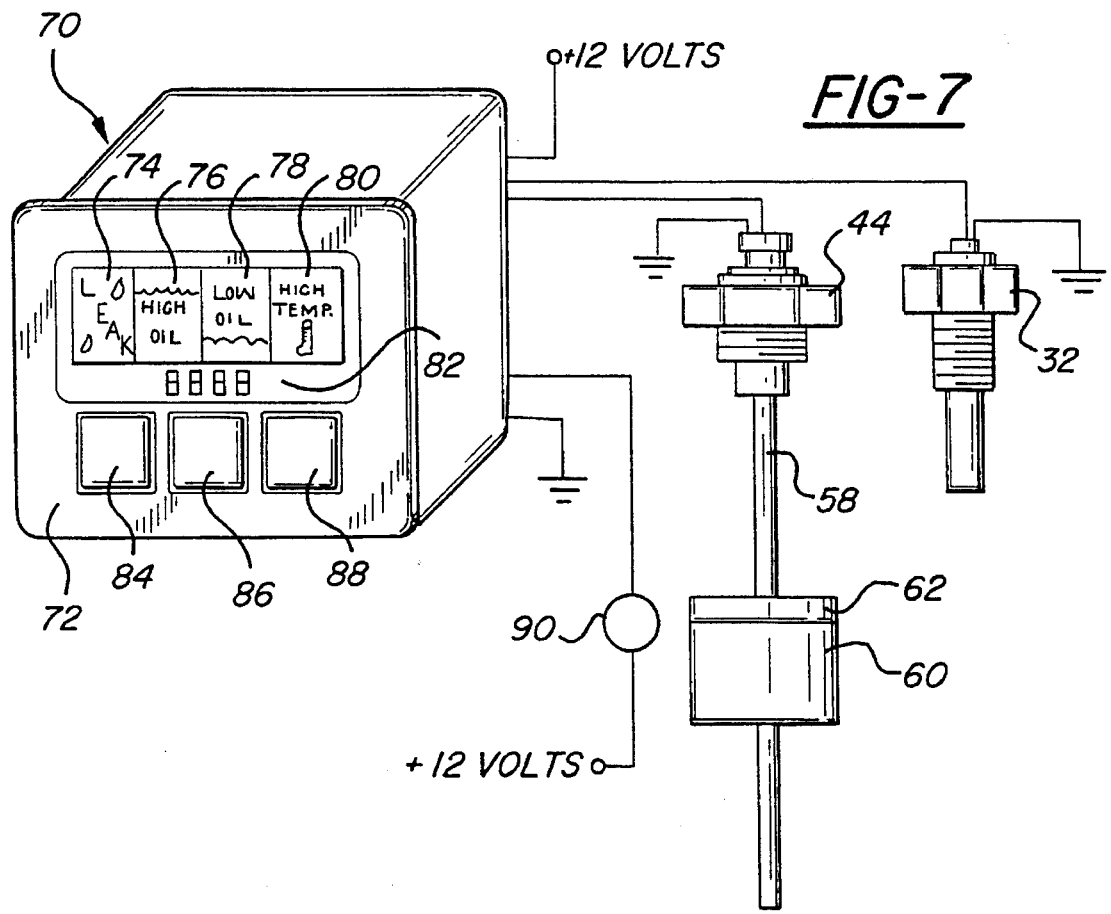
FIG. 7 is a schematic wiring diagram of the self-calibrating hydraulic fluid leak detection system of the present invention.

FIG. 7 illustrates the electrical connections of the hydraulic leak detection system. As can be seen, monitoring unit 70 is supplied with twelve (12) volts DC from the turf machine battery source and is grounded to the turf machine chassis. Level sensor 44 and temperature sensor 32 are each connected to monitoring unit 70, and a piezo (electric) buzzer 90 is provide and connected to monitoring unit for providing an audible warning. Referring to FIG. 12, a block diagram of monitoring unit 70 is depicted. Monitoring unit 70 generally includes a microprocessor 180 which executes programs 100 as are described in FIGS. 7-10. A microprocessor 180 communicates with a memory 182 which stores calibration data, to be described further herein. Inputs to the microprocessor 180 generally include the oil temperature, the fluid level, and various other inputs for executing the leak detection. Microprocessor 180 also outputs various signals and alarms for actuating various visual and audio alarms.

Figure 8:
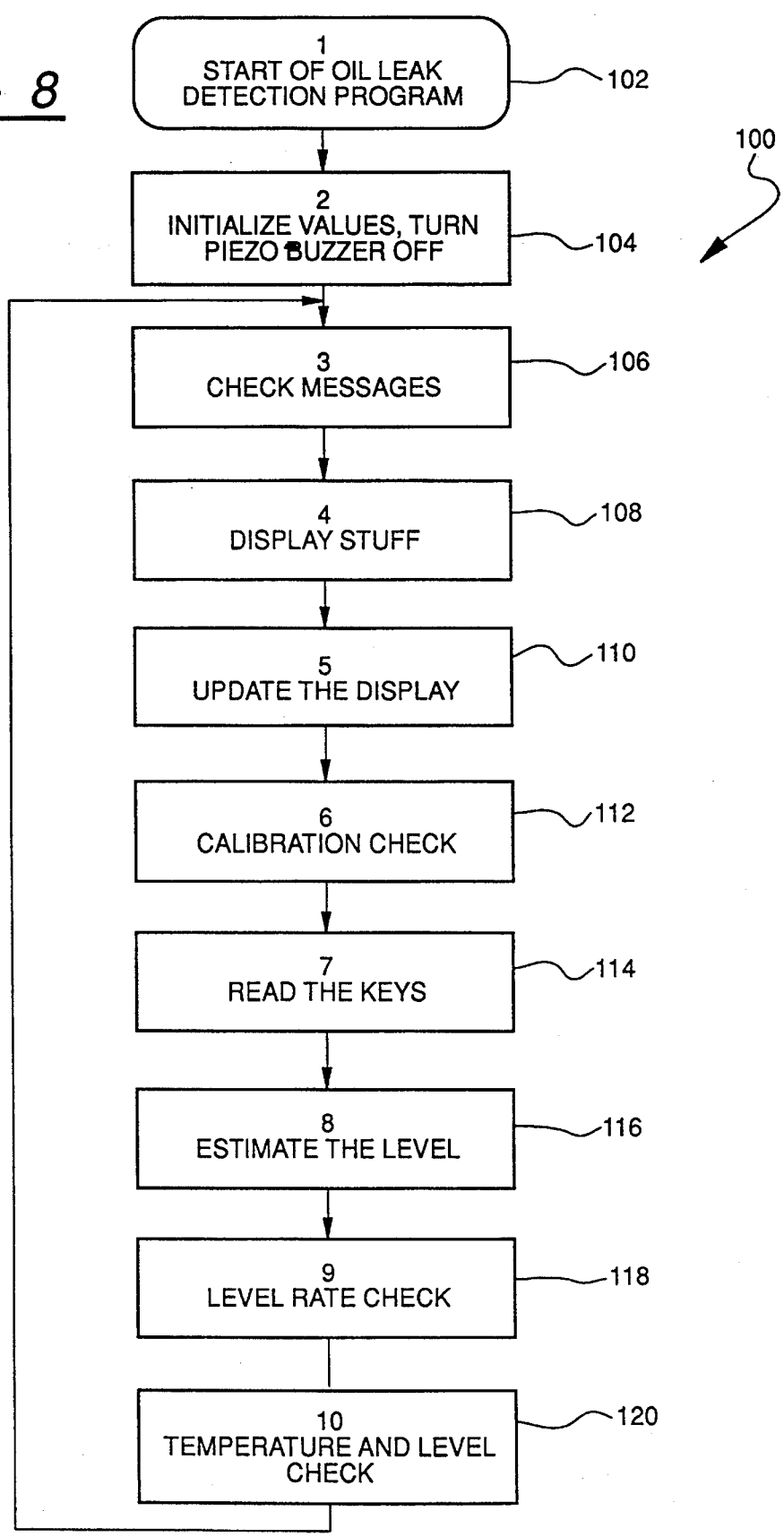
FIG. 8 is a flow chart illustrating the steps for determining a leak condition in the hydraulic fluid system of a typical turf machine in accordance with the method of the present invention.
Figure 9:
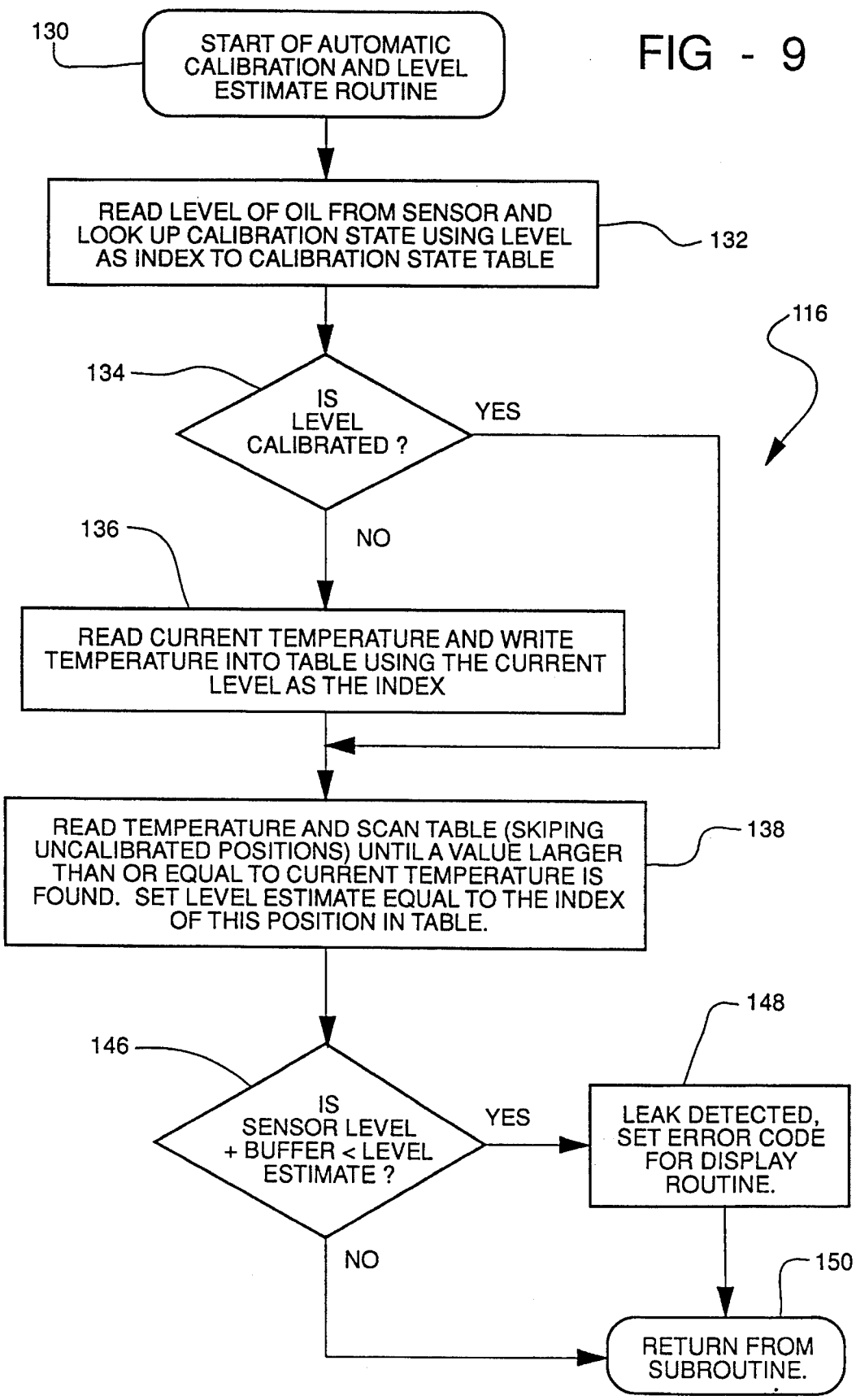
FIG. 9 is a flow chart further illustrating the steps for determining the level of fluid level within the expansion tank and for determining if a leak exists in accordance with the method of the present invention.
Figure 10:
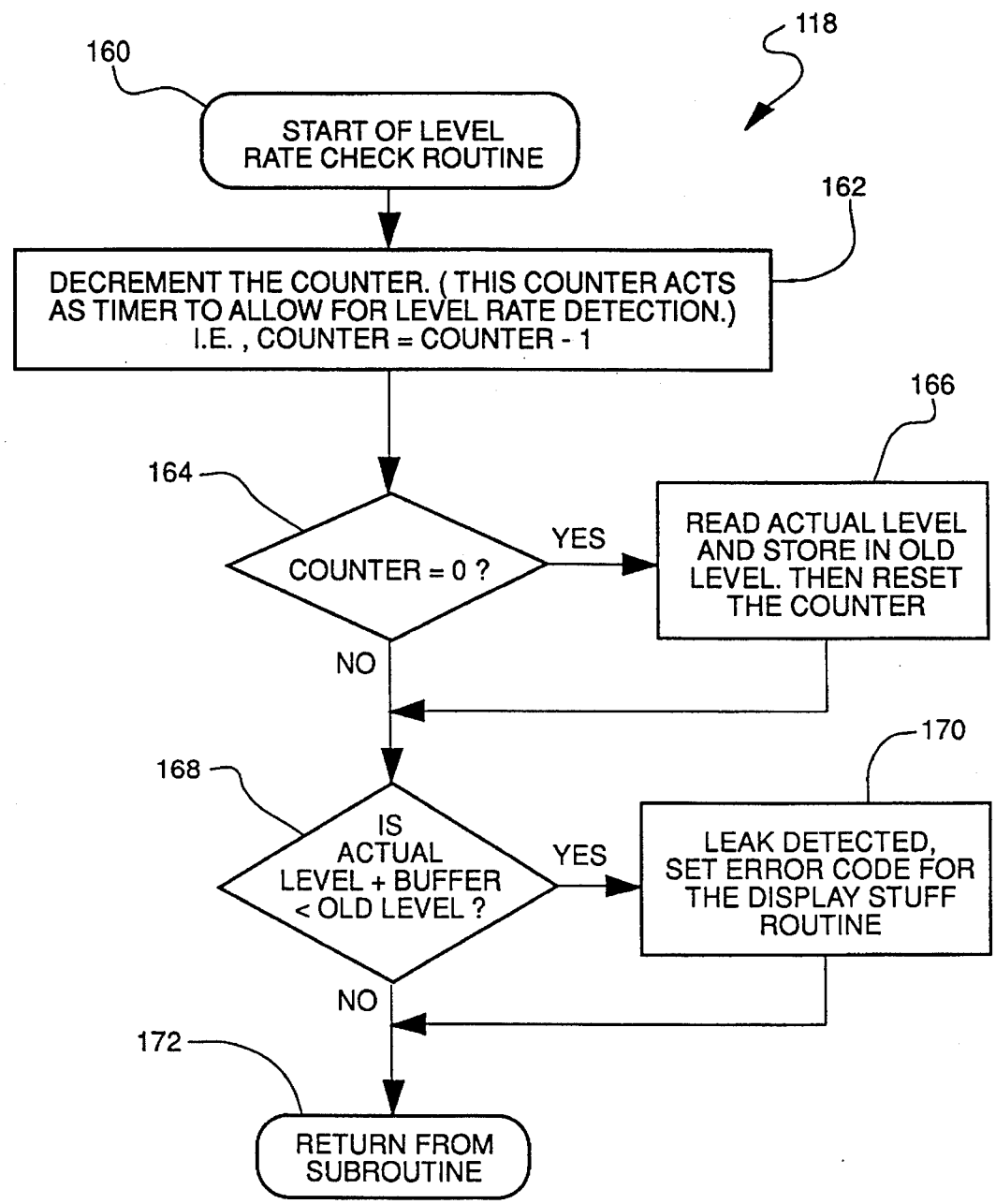
FIG. 10 is a flow chart illustrating the steps for determining the rate of change of the level of hydraulic fluid within the hydraulic fluid system of a typical turf machine in accordance with the method of the present invention.

With reference to FIGS. 8–10, the method 100 of monitoring the hydraulic fluid system of turf machine and for determining the existence of a leak will be described. The method enters at bubble 102 and proceeds to the INITIALIZE VALUES, TURN PIEZO BUZZER OFF block 104 at which an initiation routine is performed. During initialization, the selected saved values are retrieved from the EEPROM, the icons 74–80 are illuminated and the buzzer 90 is activated for approximately one second. The method then proceeds to the CHECK MESSAGES block 106. Messages are data from operator inputs via membrane buttons 84–88, or indications from the ESTIMATE THE LEVEL block 116 and LEVEL RATE CHECK block 118, which will be described below, that a leak has occurred. The method then proceeds to the DISPLAY STUFF block 108. At block 108 a display driver determines which icons 74–80 to illuminate and/or whether or not to activate piezo buzzer 90 in response to the messages and so activates the icons 74–80 and/or piezo buzzer 90. At the UPDATE THE DISPLAY block 110 an LCD display driver operates to display the most recent numeric values for the selected units, fluid level or fluid temperature, on numeric display 82.

The method then proceeds to the CALIBRATION CHECK block 112 where a software flag is checked to determine whether the operator has indicated that a calibration table reset should be performed. If the calibration flag is set, the calibration table is reset so that each position in the entire calibration table is set to a predetermined value. A calibration is requested by first holding button 84 until icon 74 is illuminated, then holding button 88 until icon 80 is illuminated and then holding buttons 84 and 88 simultaneously for three (3) seconds until "AUTO" appears on display 82. During calibration table reset, a map or table of the fluid temperature in reservoir 16 versus the fluid level in expansion tank 16 is reset so that each position stores a predetermined value which indicates that the position in the table has not been calibrated. To be explained in greater detail herein as the temperature of the fluid rises, the fluid level is monitored to provide a map of the fluid level versus temperature for a range of fluid levels and temperatures. This information is then stored in memory automatically while simultaneously performing leak detection. The procedure of pressing button 84 and then button 88 and then both buttons 84 and 88 provides a lock-out means to prevent unauthorized individuals from resetting the calibration table.

FIG. 13 depicts a map 190 which is exemplary of a map stored in memory 182 by microprocessor 180. As can be seen in FIG. 13, the map stores a hydraulic fluid (or oil) level and a corresponding hydraulic fluid (or oil) temperature. For example, if the oil level detected by the float sensor in expansion tank 16 (measured in counts) is measured at 40 counts, the temperature of the hydraulic fluid is approximately 50° F. Similarly, if the oil level in expansion tank 16 is 115 counts the oil temperature is approximately 100° F. Note that the table 190 of FIG. 13 is merely exemplary for providing oil levels and temperatures at various increments. An exemplary table may have between fifteen and forty index locations depending on the particular application. It will be understood by one skilled in the art that temperature stored depends on the fluid level at the specific temperature. Note that the temperature of the hydraulic fluid is initially at approximately ambient temperature. As the hydraulic system operates, the oil temperature rises and will eventually peak. Ideally, table 190 covers a range of temperatures and corresponding oil levels from the lowest possible ambient temperature to the highest possible oil temperature, typically 40° F. to 160° F., but the range may vary.

The method next proceeds to the READ THE KEYS block 114. The read the keys block 114 reads the membrane switches 84–88 and sets system flags, such as the calibration flag, display temperature flag, etc., so that the requested functions are performed. The method then proceeds to the ESTIMATE THE LEVEL block 116.

The ESTIMATE THE LEVEL BLOCK 116 executes a routine for determining the actual level of fluid in the expansion tank 16 and for comparing it to a level which is determined previously during calibration. FIG. 9 illustrates the steps of the estimate the level routine which enters at bubble 130 and then proceeds to READ LEVEL block 132 where the hydraulic level is determined by reading the level sensor 44. The output from level sensor 44 typically undergoes an ND conversion so that the microprocessor interprets the level measured in counts, which serves as an index into the calibration state table, described in detail with respect to FIGS. 13. The calibration table is stored in an EEPROM memory, and the memory contents referenced by the index is a temperature, which is retrieved by the microprocessor. At diamond 134, the retrieved temperature is examined to verify that a calibration value has been stored for the oil level serving as an index. Typically, the memory positions which define the table are preset to a specified value, as described with respect to CALIBRATION CHECK block 112, which is either an improbable or illegal value. If the retrieved value is the preset value, no calibration has been stored for that oil level, and control proceeds to WRITE TEMPERATURE block 136. At WRITE TEMPERATURE block 136, the oil temperature is measured using the temperature sensor 32. The measured temperature is stored in the memory location indexed in accordance with level of the hydraulic fluid from READ LEVEL block 132.

If the level read at REAL LEVEL block 132 is calibrated, or following WRITE TEMPERATURE block 136, control proceeds to READ/SCAN block 138 where the temperature measured by temperature sensor 32 is read and the table values are scanned until a temperature greater than or equal to the read temperature is located. The index value referencing the located temperature is then selected as the level estimate, i.e., the level corresponding to the temperature read as previously determined during calibration. At diamond 146 the estimated level is compared to the level read at block 132. If the estimated level is within a buffer value of the level read by level sensor 44 (the actual level), the buffer being based upon the desired sensitivity of the system which can be adjusted to allow small level differences between the estimated expansion tank level and the actual expansion tank level without triggering the alarm, of the actual level, then the routine is exited at bubble 150.

If the estimated level is not within a buffer value of the actual level, AT LEAK DETECTED block 148 an error code is set for the DISPLAY STUFF routine at block 108, and the routine is exited at bubble 150. After performing the ESTIMATE THE LEVEL routine at block 116, the method proceeds to the LEVEL RATE CHECK block 118. The level rate check routine is illustrated in FIG. 10, and it determines the rate at which the fluid level is changing within the system. If the level is changing too rapidly, a leak is indicated. With reference to FIG. 10, the level rate check routine enters at bubble 160 and proceeds to the DECREMENT COUNTER block 162. A counter is decremented by one unit each time through the routine. At diamond 164 if the counter is zero, the actual expansion tank level is read and saved as the old level, and the counter is reset at block 166. At diamond 168 if the actual level is not within a buffer value of the old level, a leak is detected and at LEAK DETECTED block 170 an error code is set. The routine then exits at bubble 172.

At TEMPERATURE AND LEVEL CHECK BLOCK 120 the actual fluid temperature in reservoir 14 and the actual fluid level in expansion tank 16 are checked against system constants. If the actual temperature and level is above or below these constants, an error code is set to cause the DISPLAY STUFF routine at block 108 to illuminate the appropriate icon 74–80 and/or activate the piezo buzzer 90. The method then loops back to CHECK MESSAGES block 104 and repeats. The method continuously loops during operation of turf machine 10 for detecting hydraulic fluid system operation and the presence of leaks.

FIG. 5 illustrates an alternative arrangement for expansion tank 16 and level sensor 44. In FIG. 5, expansion tank 16' is shown modified to accommodate two (2) level sensors 44a and 44b, respectively. As previously discussed, level sensor 44 has a plurality of switches spaced along shaft 58, and in the preferred embodiment, level sensors 44 is eleven (11) inches long with nine (9) switches spaced at one (1) inch intervals. Thus, level sensor 44 has a sensitivity of approximately one (1) inch. In FIG. 5, a pair of level sensors 44a and 44b are shown offset with respect to each other by approximately ½ inch, or ½ the sensitivity range of a single level sensor 44. The level sensors 44a and 44b are then wired in series to monitoring unit 70. As will be appreciated, this arrangement provides for ½ inch sensitivity or approximately twice the sensitivity of a single level sensor 44. In all other aspects the hydraulic fluid leak detection system of the present invention functions as described.

Figure 11:
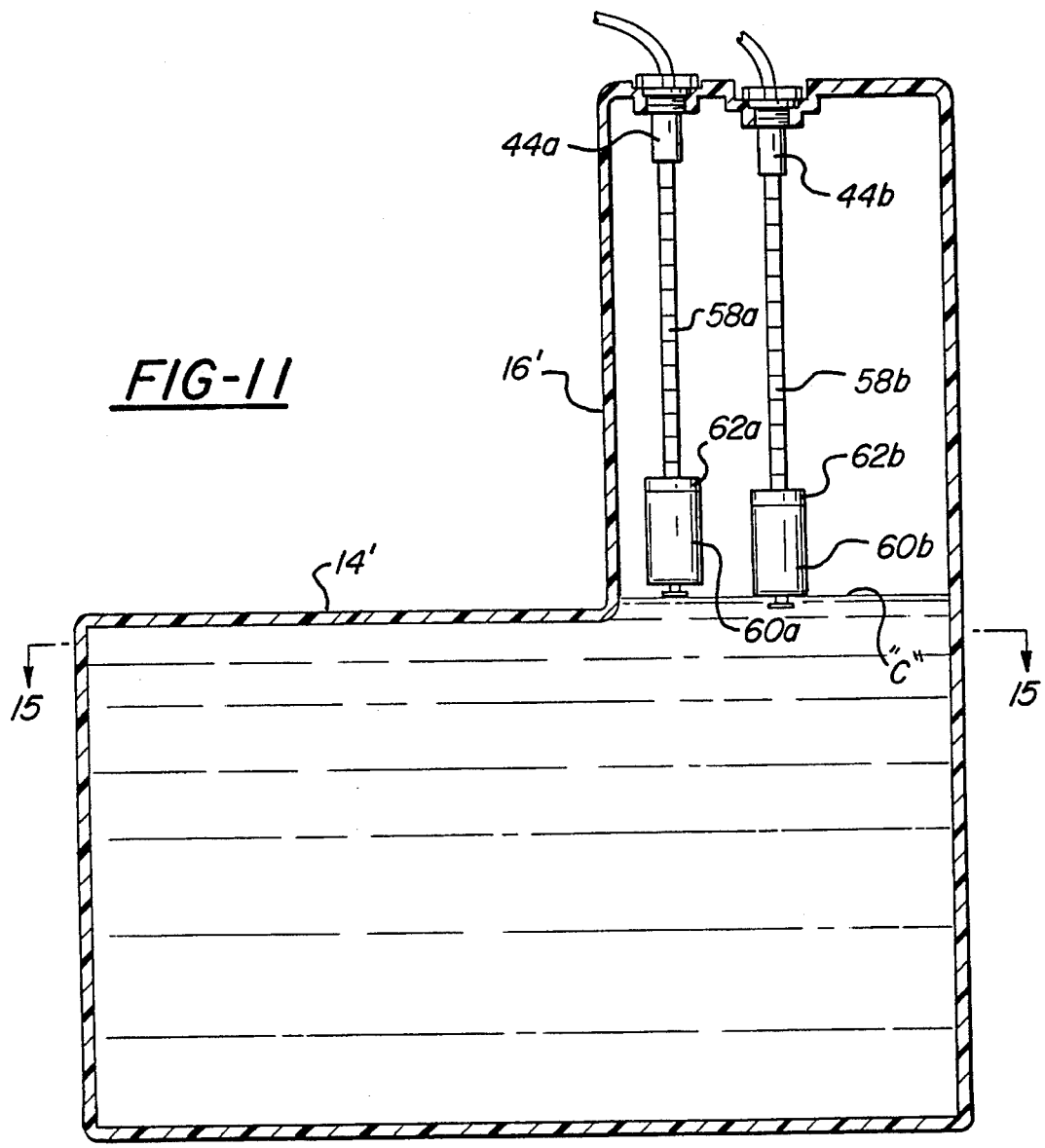
FIG. 11 is a sectional view through a reservoir and expansion tank according to an additional embodiment of the present invention.

FIG. 11 illustrates an alternate embodiment for the arrangement of reservoir 14 and expansion tank 16 wherein primed reference numerals are used to identify similar elements from the preceding embodiment. As can be seen from FIG. 11, expansion tank 16' is made integral to reservoir 14' such that hydraulic fluid contained in reservoir 14' is also in communication with expansion tank 14'. Float sensors 44a and 44b are shown disposed within expansion tank 16' for measuring the fluid level as described, the level for cold fluid being indicated at "C". As will be appreciated, as the hydraulic fluid is heated and expands, it will fill expansion tank 16', and as the fluid cools, it will contract back into reservoir 14'. It should also be understood that a single float sensor may be used depending on the required sensitivity of the leak detection system.

Referring to FIG. 14, a cross-sectional view of the expansion tank 16' and reservoir 14' depicted in FIG. 11 demonstrates a particularly advantageous feature of this invention. It will be noted that while this advantageous feature is demonstrated with reference to expansion tank 16' and reservoir 14' as shown in FIG. 14 the features are equally advantageously realized by the design of expansion tank 16 and reservoir 14 depicted in FIGS. 2–5. Assuming reservoir 14' of FIG. 14 has a surface area 196 and expansion tank 16' has a surface area 194, when the temperature of hydraulic system fluid in reservoir 14' rises and the fluid expands so that the fluid level C (depicted in FIG. 11) rises into expansion tank 16', the fluid level rise is multiplied due to the decreased surface area of expansion tank 16'. That is, because expansion tank 16' has a surface area 194 which is substantially less than the surface area 196 of reservoir 14', the increase in the fluid level C is greater in expansion tank 16' than would be if expansion tank 16' had a surface area equal to the surface area 196 of reservoir 14'. Further, the multiplicative effect of the decrease in surface area 194 of expansion tank 16' may be determined as a ratio between the surface area 196 of reservoir 14' to the surface area 194 of expansion tank 16'. For example, assume that the surface area 194 of reservoir 14' is 100 sq. in. and that the surface area 194 of reservoir 16' is 20 sq. in., then the ratio of the surface area 196 to the surface area 194 is 100:20 or 5:1. This necessarily implies that expansion tank 16' has a gain of 5 with respect to reservoir 14' and is thus more sensitive to changes in the fluid level C than reservoir 14'.

Note that while the foregoing description describes a self-calibrating leak detection system for implementation on turf care equipment, the principles of the present invention are equally applicable to any vehicle or machine possessing a hydraulically powered apparatus. For example, the system may be particularly applicable to construction equipment such as front end loaders, bulldozers, power shovels, and the like which rely on hydraulic power for operation. In particular, when such equipment experiences a leak of hydraulic fluid from the hydraulic system the losses attributed to equipment damaged by excessive, undetected fluid loss may be substantial. Such losses would be avoidable by implementing the self-calibrating hydraulic leak detection system as described above. Further, the self-calibrating leak detection system is equally applicable to machines that have regular mechanical drives or systems which use internal combustion engines but also utilize hydraulic power supplies to operate reels and reel lift equipment.

While specific embodiments have been shown and described in detail to illustrate the principles of the hydraulic leak detection system of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A hydraulic fluid leak detection system for a self-propelled land vehicle or self-propelled machine including a hydraulically actuated device and a reservoir of hydraulic fluid, the system comprising:

an expansion tank disposed adjacent and in communication with the reservoir;

a first sensor disposed within the expansion tank, the first sensor operable for sensing the level of hydraulic fluid in the expansion tank and for producing a first electronic signal corresponding thereto;

a second sensor operable for sensing the temperature of the hydraulic fluid in the reservoir and for producing a second electronic signal corresponding thereto;

memory for storing the level of hydraulic fluid in the expansion tank and for storing the temperature of the hydraulic fluid in the reservoir;

processing means for receiving the electronic signals and for determining from the first and second electronic signals if a leak exists in the hydraulic fluid system; and means for indicating to an operator that a leak exists in the hydraulic fluid system.

2. The hydraulic fluid leak detection system of claim 1 wherein the memory stores a map which associates with the hydraulic fluid level a corresponding fluid temperature.

3. The hydraulic fluid leak detection system of claim 2 wherein the fluid temperature and a corresponding fluid level are stored while performing leak detection.

4. The hydraulic fluid leak detection system of claim 3 wherein the map is stored in memory and is reset in response to a request to recalibrate the system.

5. The hydraulic fluid leak detection system of claim 4 wherein an operator initiates the calibration process.

6. The hydraulic fluid leak detection system of claim 5 wherein the processing means detects leaks during the operation of the hydraulic system and during transport of the vehicle or machine.

7. The hydraulic fluid leak detection system of claim 6 wherein an operator may compensate for a change of shape of the expansion tank by recalibrating the system.

8. The hydraulic fluid leak detection system of claim 1 wherein the expansion tank covers a first horizontal area and the reservoir covers a second horizontal area, and the first horizontal area is less than the second horizontal area to effect a multiplication of the change in fluid level of the reservoir in accordance with a ratio of the horizontal areas.

9. The hydraulic fluid leak detection system of claim 1 wherein the expansion tank includes a flared section at the top to accommodate fluid overflow.

10. The hydraulic fluid leak detection system of claim 1 wherein the processing means is further operable for determining if the hydraulic fluid level within the system is below a predefined normal operating level.

11. The hydraulic fluid leak detection system of claim 1 wherein the processing means is further operable for determining if the hydraulic fluid level within the system is above a predefined normal operating level.

12. The hydraulic fluid leak detection system of claim 1 wherein the processing means is further operable for determining if the hydraulic fluid temperature within the system is above a predefined normal operating range.

13. The hydraulic fluid leak detection system of claim 1 wherein the processing means is operable to determine a rate of change of the fluid level within the expansion tank and for comparing the determined rate of change to an allowable rate of change for signalling the presence of a leak.

14. The hydraulic fluid leak detection system of claim 1 wherein the first sensor comprises a float sensor.

15. The hydraulic fluid leak detection system of claim 1 wherein the first sensor comprises a plurality of float sensors, the float sensors being disposed in an offset relationship with respect to each other.

16. A hydraulic fluid leak detection system for a self-propelled vehicle or self-propelled machine having a hydraulic system for operating at least one hydraulically actuated device, the system comprising:

a reservoir for storing hydraulic fluid;

an expansion tank disposed adjacent and in communication with the reservoir;

a first sensor disposed within the expansion tank, the first sensor operable for sensing the level of hydraulic fluid in the expansion tank and for producing a first electronic signal corresponding thereto;

a second sensor operable for sensing the temperature of the hydraulic fluid in the reservoir and for producing a second electronic signal corresponding thereto;

a fluid channel between the expansion tank and the reservoir for transferring hydraulic fluid therebetween, the fluid channel connecting to the upper-most portion of the reservoir to channel air in the reservoir to the fluid channel; and an expansion tube in the expansion tank connected to the fluid channel, the expansion tube extending substantially to the bottom of the expansion tank and being submerged in hydraulic fluid in the expansion tank.

17. The hydraulic fluid leak detection system of claim 16 wherein the expansion tank covers a first horizontal area and the reservoir covers a second horizontal area, and the first horizontal area is less than the second horizontal area to effect a multiplication of the change in fluid level of the reservoir in accordance with a ratio of the horizontal areas.

18. The hydraulic fluid leak detection system of claim 16 wherein the expansion tank includes a flared section at the top to accommodate fluid overflow.

19. The hydraulic fluid leak detection system of claim 18 further comprising:

memory for storing the level of hydraulic fluid in the expansion tank and for storing the temperature of the hydraulic fluid in the reservoir;

electronic processing means for accessing the memory and for receiving the first and second electronic signals in order to determine if a leak exists in the hydraulic system; and means for indicating to an operator that a leak exists in the hydraulic system.

20. The hydraulic fluid leak detection system of claim 19 wherein the memory stores a map associating with each a corresponding fluid temperature hydraulic fluid level.

21. The hydraulic fluid leak detection system of claim 19 wherein the processing means is further operable for determining if the hydraulic fluid level within the system is below a predefined normal operating level.

22. The hydraulic fluid leak detection system of claim 19 wherein the processing means is further operable for determining if the hydraulic fluid level within the system is above a predefined normal operating level.

23. The hydraulic fluid leak detection system of claim 19 wherein the processing means is further operable for determining if the hydraulic fluid temperature within the system is above a predefined normal operating range.

24. The hydraulic fluid leak detection system of claim 19 wherein the processing means is operable to determine a rate of change of the fluid level within the expansion tank and for comparing the determined rate of change to an allowable rate of change for signalling the presence of a leak.

25. In a self-propelled land vehicle or self-propelled machine including a hydraulic system having a hydraulically actuated device, a hydraulic fluid leak detection system, comprising:

a reservoir for hydraulic fluid used in the hydraulic system;

an expansion tank disposed adjacent and in communication with the reservoir;

a first sensor disposed within the expansion tank, the first sensor operable for sensing the level of hydraulic fluid in the expansion tank and for producing a first electronic signal corresponding thereto;

a second sensor operable for sensing the temperature of the hydraulic fluid in the reservoir and for producing a second electronic signal corresponding thereto;

memory for storing the level of hydraulic fluid in the expansion tank and for storing the temperature of the hydraulic fluid in the reservoir;

electronic processing means for receiving the electronic signals and for determining from the first and second electronic signals if a leak exists in the hydraulic system; and means for indicating to an operator that a leak exists in the hydraulic system, thereby effecting a hydraulic fluid leak detection system.

26. The hydraulic fluid leak detection system of claim 25 wherein the memory stores a map associating with each stored hydraulic fluid level a corresponding fluid temperature.

27. The hydraulic fluid leak detection system of claim 25 wherein the expansion tank covers a first horizontal area and the reservoir covers a second horizontal area, and the first horizontal area is less than the second horizontal area to effect a multiplication of the change in fluid level of the reservoir in accordance with a ratio of the horizontal areas.

28. The hydraulic fluid leak detection system of claim 25 wherein the expansion tank includes a flared section at the top to accommodate fluid overflow.

29. The hydraulic fluid leak detection system of claim 25 wherein the processing means is further operable for determining if the hydraulic fluid level within the system is below a predefined normal operating level.

30. The hydraulic fluid leak detection system of claim 25 wherein the processing means is further operable for determining if the hydraulic fluid level within the system is above a predefined normal operating level.

31. The hydraulic fluid leak detection system of claim 25 wherein the processing means is further operable for determining if the hydraulic fluid temperature within the system is above a predefined normal operating range.

32. The hydraulic fluid leak detection system of claim 25 wherein:

the machine or vehicle is a turf care machine; and the processing means is operable to determine a rate of change of the fluid level within the expansion tank and for comparing the determined rate of change to an allowable rate of change for signalling the presence of a leak.

33. A method for detecting the presence of a leak in the hydraulic system of mobile equipment, the hydraulic system having a hydraulically actuated device and a reservoir containing fluid, the method comprising the steps of:

communicating fluid between the reservoir and an expansion tank in response to expansion and contraction of the fluid due to thermal cycling;

measuring a temperature of the fluid contained within the reservoir;

measuring an actual fluid level in the expansion tank;

comparing the measured fluid level at the measured fluid temperature with a stored fluid level at a stored fluid temperature corresponding to the measured fluid temperature to determine if a leak exists in the hydraulic system; and signalling that a leak exists if for a measured temperature the actual fluid level is not within a predefined buffer value of the stored fluid level for a corresponding stored temperature.

34. The method of claim 33 further comprising the step of storing a map of fluid level versus fluid temperature upon initiation of a calibration step.

35. The method of claim 33 further comprising the step of storing said fluid temperature and fluid level in a map having for each fluid level a corresponding stored fluid temperature.

36. The method of claim 35 wherein the fluid temperature and fluid level are stored during the leak detection process.

37. The method of claim 33 further comprising the step of determining if the hydraulic fluid level within the system is below a predefined normal operating level.

38. The method of claim 33 further comprising the step of determining if the hydraulic fluid level within the system is above a predefined normal operating level.

39. The method of claim 33 further comprising the step of determining if the hydraulic fluid temperature within the system is above a predefined normal operating range.

40. The method of claim 33 further comprising the steps of:

determining the rate of change of the actual fluid level within the expansion tank; and signalling the existence of a leak if the rate of change of the actual fluid level in the expansion tank exceeds a predefined value.

41. The method of claim 40 wherein the step of determining the rate of change of the level of fluid in the expansion tank comprises:

setting an old fluid level;

comparing the actual fluid level to the old fluid level; and setting the old fluid level equal to the actual fluid level after a predefined period of time.

42. The method of claim 33 wherein the mobile equipment is a turf care machine, and the step of signalling comprises the steps of:

illuminating a display lamp; and activating an audible alarm.

43. The hydraulic fluid leak detection system of claim 14 wherein the float sensor is centrally located within the expansion tank.

44. The hydraulic fluid leak detection system of claim 16 wherein the expansion tank is located apart from the main reservoir.

45. The hydraulic fluid leak detection system of claim 16 wherein the expansion tank is integral to the main reservoir.

46. The hydraulic fluid leak detection system of claim 16 wherein the fluid channel comprises a conduit.

* * * * *